Feb. 3, 1953 N. I. SCHAFLER ET AL 2,627,364
FERTILIZER AND LIME SPREADER
Filed April 30, 1949 2 SHEETS—SHEET 1
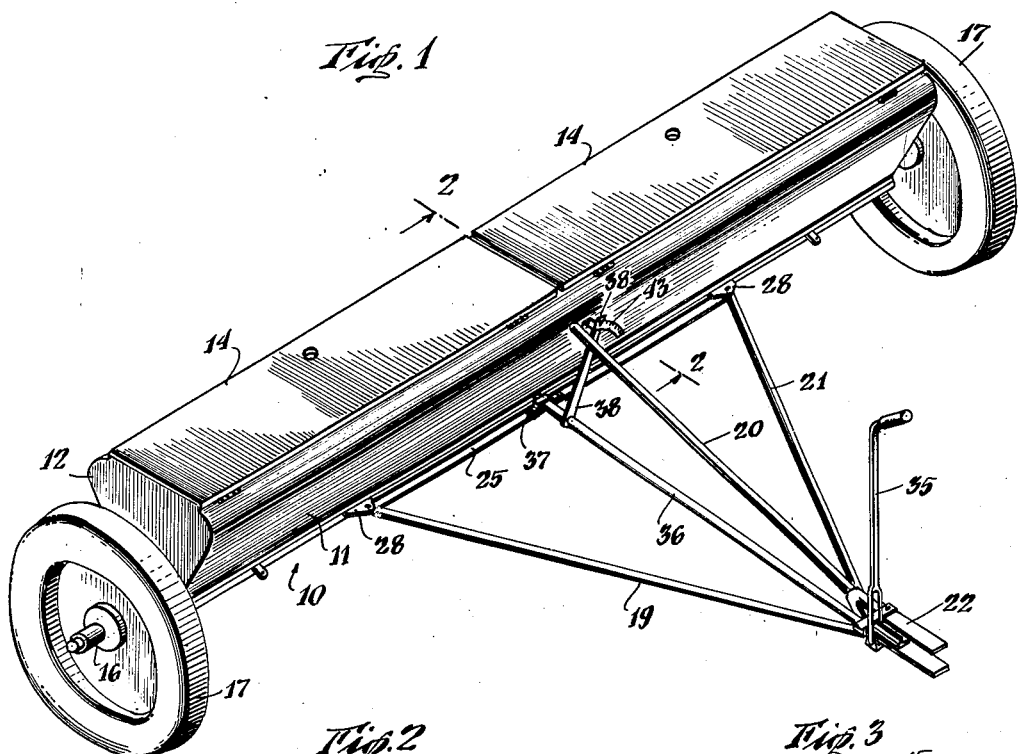
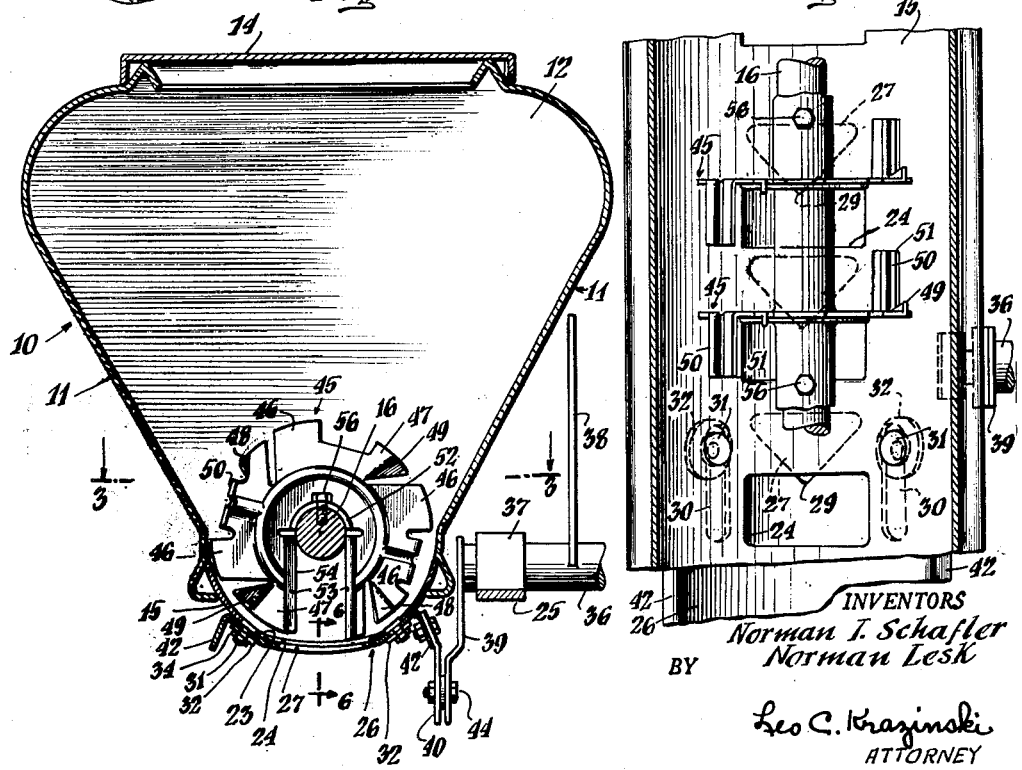
INVENTORS
Norman I. Schafler
Norman Lesk
BY
Leo C. Krazinski
ATTORNEY

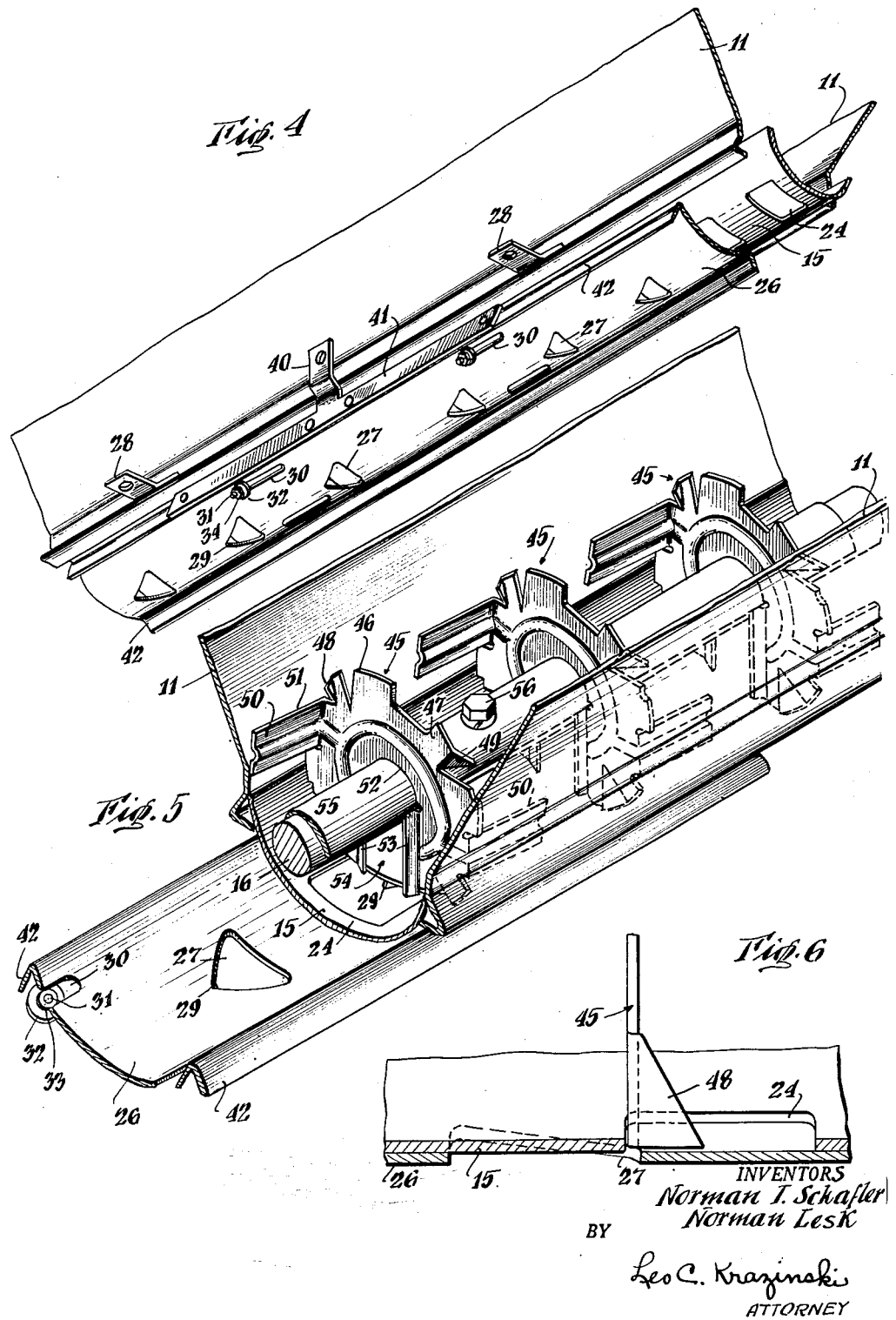

Patented Feb. 3, 1953

2,627,364

UNITED STATES PATENT OFFICE 2,627,364

FERTILIZER AND LIME SPREADER

Norman I. Schafler, New York, and Norman Lesk, Laurelton, N. Y., assignors to Mount Vernon Implement Co., Inc., Mount Vernon, N. Y., a corporation of New York Application April 30, 1949, Serial No. 90,656

4 Claims. (Cl. 222—267)

The present invention relates to scattering unloaders, particularly to apparatus for spreading and depositing fertilizer, lime, seeds, and the like on soil.

Apparatus of the foregoing type heretofore utilized generally comprises an elongated hopper having spaced openings therein, a plate adjacent the hopper bottom having spaced openings adapted to register with the hopper openings, means for slidably mounting the plate to adjust the extent of registry of the hopper and plate openings, and an agitator within the hopper. Such apparatus had numerous disadvantages. When the openings were adjusted to allow a small amount of material to pass therethrough, the material tended to pack and clog the openings. When the openings were adjusted to prevent such clogging, more than the desired amount of material passed therethrough resulting in waste of material, improper spreading of the material, or other undesirable conditioning of the soil. Also, such prior apparatus failed to make proper provision for breaking up lumps in the material. Other difficulties resulted from improper agitation of the material and the "hanging up" of material on the hopper sides.

The present invention aims to provide improved apparatus of the foregoing type which eliminates the difficulties and disadvantages heretofore encountered in a simple, practical, and economical manner.

Accordingly, an object of the present invention is to provide a hopper bottom from which the entire contents are expelled and "hanging up" of material is prevented.

Another object is to provide openings in the hopper bottom and in the adjustment plate which are so shaped that they cooperate to enable material to pass therethrough at rates varying over a wide range without clogging or permitting lumps to pass therethrough.

Another object is to provide an improved agitator for the hopper which is readily removed for cleaning and which breaks up lumps and cooperates with the openings to enable the material to pass therethrough in the aforesaid manner.

A further object is to provide apparatus of the foregoing type which is adapted for spreading a wide variety of materials in an efficient manner.

Other and further objects will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by providing a hopper having a series of spaced openings in the bottom thereof each formed with a substantially straight transversely extending side, and a plate facing the underside of the bottom of the hopper having a series of spaced openings formed with a pointed or triangular portion adapted to at least partially register with the straight side of the hopper openings. For example, the hopper openings may be rectangular and the plate openings may be triangular and may be positioned so that an apex thereof is adapted to at least partially register with a hopper opening. Agitating means are provided in the hopper which include a rotatable disc for each hopper opening formed with one or more ear portions adapted to pass within the openings in the hopper and over the portion of the plate openings in registry with the hopper openings to prevent clogging thereof. Certain of these ears may have laterally offset portions to agitate the material within the hopper openings. The discs may further be formed with one or more lateral portions adapted to be moved across the bottom of the hopper adjacent the openings therein to crush particles of the material in the hopper or to sweep or scrape the material from the bottom of the hopper and to direct the material towards the openings. The discs also may have slots providing tooth-like elements for cutting or crushing lumps in the material. The discs are still further formed with a central recess and a slot or opening leading thereto from the periphery thereof to facilitate removably mounting the discs on a rotatable shaft, and to facilitate lengthwise movement of the material through the discs.

A preferred embodiment of the invention has been chosen for purposes of illustration and description and is shown in the accompanying drawing, forming a part of the specification, wherein:

Figure 1 is a perspective view of apparatus in accordance with the present invention;

Figure 2 is a sectional view taken along the line 2—2 on Figure 1;

Figure 3 is a fragmentary sectional view taken substantially along the line 3—3 on Figure 2;

Figure 4 is a fragmentary perspective view of the underside of the hopper;

Figure 5 is a fragmentary perspective view looking into the hopper; and

Figure 6 is a sectional view taken along the line 6—6 on Figure 2.

Referring to the drawings in detail and more particularly to Figures 1 and 2, there is shown apparatus for spreading or depositing material, such as fertilizer, lime, or seeds on the soil which has an elongated hopper 10 for the material comprising a pair of sides 11 converging at the lower end thereof, a pair of end walls 12, a pair of hinged covers 14 for the top opening of the hopper, and a bottom 15 which will be described in detail hereinafter. The end walls 12 each have a bearing (not shown) for rotatably mounting a shaft or axle 16 which extends lengthwise through the hopper adjacent the bottom. The ends of the shaft extend outwardly beyond the walls 12 and wheels 17 or the like are rigidly secured thereto. The wheels serve as traction means for the hopper and rotate the shaft when the hopper is drawn across the ground. A draw bar assembly (Figure 1) is provided for this purpose comprising struts or rods 19, 20, and 21, each having one end attached to the hopper and each having its other end fastened together by a clamp 22.

The hopper bottom 15 (Figures 2 to 6) is arcuate or generally semi-circular in cross-section having a slightly flattened trough 23 and is secured between the lower ends of the hopper sides 11. The trough has a series of spaced rectangular openings 24 therein which are positioned so that the long sides thereof extend transversely or substantially at right angles to the longitudinal axis of the bottom to provide the openings with an arcuate shape corresponding to the curvature of the bottom.

A lengthwise extending plate 26 conforming to the curvature of the bottom 15 faces and contacts the underside of the bottom. The plate has a series of spaced openings 27 therein which may be triangular or have a pointed or apex portion 29 facing in a longitudinal direction and positioned to at least partially register with a long side of the openings 24 whereby an effective opening is provided through which material in the hopper can pass.

The plate 26 is mounted for lengthwise sliding adjustment on the hopper bottom to vary the effective opening provided by registry of the apertures 24 and 27 and to thereby adjust the rate at which material passes therethrough. This may be accomplished by providing a plurality of lengthwise slots 30 (Figures 2, 3, 4, and 5) in the plate through which threaded studs 31 secured to the bottom 15 extend, and applying bushings 32 and nuts 34 to the studs adapted to support the plate on the bottom for sliding movement in relation thereto. The studs may have rotatable anti-fraction collars 33 thereon positioned in the slots 30 for facilitating sliding movement of the plate 26.

As shown in Figures 1, 2, and 3, sliding movement of the plate may be effected by means comprising a handle 35 (Figure 1) on a shaft 36 having one end supported by the draw bar clamp 22 and having its other end supported by and extending through a bearing 37 carried by a strap 25 secured to lugs 28 at the side of the hopper, a lever 39 having one end secured to the shaft 36, and an arm 40 of a bracket 41 (Figure 4) secured to a side flange 42 of the plate 26, which arm is pivotally connected to the other end of lever 39 by a pin 44. An arm 38 on the shaft 36 and an indicia segment 43 on the side of the hopper may be utilized to indicate the magnitude of the effective opening (Figure 1).

Agitating means are associated with the shaft 16 which comprises a series of spaced discs 45 each positioned adjacent one of the hopper openings 24. These discs are shown in Figures 2 and 5 and comprise a plurality of ears 46, six being shown in number, a pair of laterally extending arms 50 facing in opposite directions and being diametrically opposite with respect to each other, and a pair of ears 47. Slots or recesses serve to space the ears and arms to provide surfaces adapted to act as teeth.

The ears 46 have their peripheral portions on a predetermined diameter and are positioned so that these ears are adapted to pass within the hopper openings 24 adjacent the straight edge thereof upon rotation of the discs to clear the effective opening formed by registering portions of the hopper and plate openings (Figure 6). Certain of these ears 46, for example two thereof, have offset portions 48 adapted to agitate and move the material laterally within the openings 24 to thereby reduce the tendency of the material to pack in or adjacent the effective opening.

The ears 47 have their peripheral portions on a slightly smaller diameter than the ears 46 and have offset portions 49 facing away from the hopper openings. These offset portions are adapted to agitate and move the material laterally adjacent the straight edge of the hopper openings to further reduce the tendency of the material to pack at these locations.

The arms 50 are on a slightly smaller diameter than the ears 47 and have a leading edge 51 which is inclined rearwardly from the outer end to the inner end so that the outer end first contacts the material to produce a wedging effect to more effectively disintegrate the material. These arms are adapted to sweep or scrape material adjacent the hopper trough and to cooperate with the hopper to crush or chop particles or lumps in the material or to churn up the material to render it free flowing.

The discs are further constructed to facilitate their removal from the shaft 16 for cleaning or repair. To accomplish this, the discs have a centrally located semicircular recess 52 for receiving the shaft 16, and a slot or opening 54 extending from the periphery of the discs to the recess 52 which is of a width to enable the shaft to pass therethrough. The discs are removably connected to the shaft by securing each disc to a member extending lengthwise along one side of the shaft, such as a semicircular sleeve 55 (Figure 5) disposed in the recesses 52, and bolts or screws 56 for securing the sleeve to the shaft. In this manner all of the discs may be conveniently removed without disturbing the shaft.

The slots 54 may be defined by offset portions 53 to assist agitating the material, and provide openings through which the material can pass from one side of the disc to the other during agitation thereof, whereby the material can move more freely in the hopper to enhance the agitating and crushing actions of the discs.

From the foregoing description it will be seen that the present invention provides improved apparatus for spreading and depositing materials such as seeds, lime, superphosphates, wet fertilizer, lumpy fertilizer, manure, or other types of fertilizer. By reason of the design of the hopper and plate openings and the cooperating discs, material may be effectively and uniformly passed therethrough at a very low rate which is desirable when spreading high concentrate fertilizer. This is made possible by the disintegrating, agitating and non-clogging action of the discs. The material may also be passed through at high rates in an efficient manner by reason of the improved adjustability of the hopper and plate openings. For example, from about 40 to 8,000 pounds of material may be spread over an acre of land. The improved arcuate hopper bottom prevents "hanging up" of material whereby the entire contents of the hopper may be expelled.

With respect to the means for preventing "hanging up" of the material, it is to be particularly noted that the intermediate portions of the sides 11 (Fig. 2) are substantially straight in order to direct the material into the bottom and in contact with the discs; while the bottom portion 15 comprises a flattened trough 23 and a semi-cylindrical portion intermediate the trough 23 and sides 11, the radial centers of the disc 45 and semi-cylindrical portion being identical and the radial center of trough 23 being somewhat greater in order to permit the disc ears 46 to penetrate within the openings 24.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What is claimed is:

1. In apparatus of the class described, the combination of an elongated hopper, a shaft mounted for rotation longitudinally in said hopper, discs spaced on said shaft, said hopper having a generally semi-cylindrical bottom extending upwardly to the approximate level of the center of said shaft and provided with a flattened trough portion in which is formed a series of spaced openings, and a plate conforming to and contacting the underside of said hopper bottom, said plate being formed with a series of spaced openings positioned to at least partially register with said hopper bottom openings.

2. In apparatus of the class described, the combination of an elongated hopper having an arcuate bottom formed with a series of spaced openings provided with a straight transverse portion; an arcuate plate contacting and conforming to the underside of said hopper bottom having a series of spaced openings provided with substantially triangular portion adapted to at least partially overlie the transverse portion of said hopper bottom openings, a rotatable shaft extending lengthwise through said hopper, and a series of spaced discs positioned on said shaft each adjacent one of said hopper openings, said discs each having an outwardly extending portion adapted to pass within said hopper openings adjacent said transverse portion thereof and across said triangular portions of said plate openings in registry with said hopper openings.

3. In apparatus of the class described, the combination of an elongated hopper having an arcuate bottom formed with a series of spaced openings provided with a rectangular portion, an arcuate plate contacting the underside of the bottom of said hopper having a series of spaced openings formed with triangular portions positioned to at least partially register with the rectangular portions of said hopper openings, a rotatable shaft extending lengthwise through said hopper, and a series of spaced discs on said shaft each positioned adjacent one of said hopper openings, said discs having a plurality of circumferentially spaced laterally extending arms adapted to be moved adjacent the bottom of said hopper and having a plurality of circumferentially spaced ears adapted to be moved within said hopper bottom openings and across the portions of said plate openings in registry with said hopper openings.

4. In apparatus of the class described, the combination of an elongated hopper having an arcute bottom formed with a series of spaced openings provided with a rectangular portion, an arcuate plate contacting the underside of the bottom of said hopper having a series of spaced openings formed with triangular portions positioned to at least partially register with the rectangular portions of said hopper openings, a rotatable shaft extending lengthwise through said hopper, and a series of spaced discs on said shaft each positioned adjacent one of said hopper openings, said discs having a plurality of circumferentially spaced laterally extending arms adapted to be moved adjacent the bottom of said hopper and having a plurality of circumferentially spaced ears adapted to be moved within said hopper bottom openings and across the portions of said plate openings in registry with said hopper openings, said discs each having teeth intermediate said arm and ears.

NORMAN I. SCHAFLER.
NORMAN LESK.

REFERENCES CITED

The following references are of record in the file of this patent:

UNITED STATES PATENTS

| Number | Name | Date |
| --- | --- | --- |
| 23,083 | Eggleston et al. | Mar. 1, 1859 |
| 27,390 | Selby | Mar. 6, 1860 |
| 208,659 | Williams | Oct. 1, 1878 |
| 215,748 | Hull | May 27, 1879 |
| 241,924 | Buswell | May 24, 1881 |
| 653,313 | Raifsnyder | July 10, 1900 |
| 738,605 | Cartin | Sept. 8, 1903 |
| 950,448 | Hege | Feb. 22, 1910 |
| 1,008,200 | Sanders | Nov. 7, 1911 |
| 1,573,493 | Heyd | Feb. 16, 1926 |
| 1,829,627 | Bamford et al. | Feb. 16, 1931 |
| 1,948,861 | Lindgren | Feb. 27, 1934 |
| 2,019,385 | Baucom | Oct. 29, 1935 |
| 2,510,231 | Juzwiak | June 6, 1950 |

FOREIGN PATENTS

| Number | Country | Date |
| --- | --- | --- |
| 382,626 | Germany | Oct. 4, 1923 |